Jan. 2, 1934.  H. ABERT  1,941,872
FRICTION FACING
Filed Dec. 31, 1931
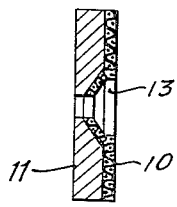
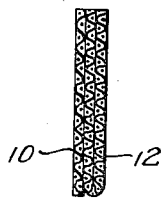
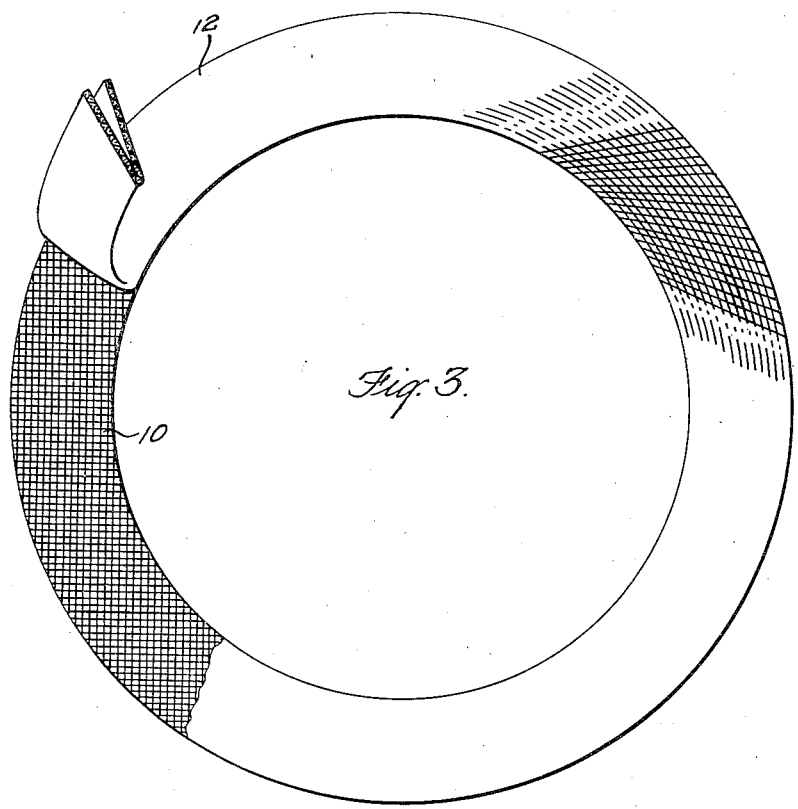
INVENTOR
HAMILTON ABERT
BY HIS ATTORNEYS Patented Jan. 2, 1934

1,941,872

UNITED STATES PATENT OFFICE 1,941,872

FRICTION FACING

Hamilton Abert, New York, N. Y., assignor to Raybestos-Manhattan, Inc., Passaic, N. J., a corporation of New Jersey Application December 31, 1931
Serial No. 584,017

6 Claims. (Cl. 154—52)

This invention relates to a friction ring, and particularly to rings such as are commonly used in friction clutches, in which the wearing surface is made of a high grade woven fabric and is backed with a material having different characteristics. The friction ring of my invention is intended primarily for a clutch facing for automotive use, but, as will be readily understood, it will have many advantages in other uses, such as in various clutches and brakes used in industrial machinery.

With the development of automotive travel, and particularly with the increased requirements of speed and pickup, and the greatly increased complexity of traffic conditions, the importance of smooth engaging and wearing qualities in the clutch have become of greater and greater importance. The recent adoption of automatic clutching and free wheeling devices have added even more to the importance of the clutch, and have increased the demand for a superior friction facing for use in automotive clutches. Since the demand in current models for lower slung car frames prescribes a small limit to the diameter which may be used in clutch discs, and since the use of single or two-plate clutches is demanded on grounds of economy, the rigorous requirements of clutch operation fall largely upon the friction facing, and accordingly the construction and the materials of the clutch facing have come to be of the greatest importance.

Prior to my invention, friction facing rings have been made by playing up rings cut from asbestos cloth without distortion. These rings have proven most satisfactory, but because of the excessive wastage which results from this method of manufacture, their cost has, in many cases, been prohibitive, and in many cases has led to the use of inferior materials.

Another method which has been adopted is the shaping of a strip of asbestos cloth or tape so as to produce a more or less flat ring. Thus, a strip of asbestos cloth, after being coated or impregnated with rubber, is passed through conical rollers geared together so as to produce a compression at one edge of the strip and a stretching at the other, and thereby to give to the strip a curved form. This curved strip is then cut to produce a ring of the required diameter, and, with its ends abutting, is placed in a suitable mold and vulcanized. Although this type of lining has some of the advantages of the undistorted rings cut from whole cloth, it is, nevertheless, a much inferior product, and cannot be used at all in very wide flanges. It cannot, for example, be made with as high a percentage of asbestos, nor as tightly woven a fabric, since the stretching action can only be satisfactorily accomplished with a comparatively loosely woven fabric and a high proportion of rubber, and with relatively narrow rings. Furthermore, near the inner edge the fabric is frequently wrinkled so that ridges of tightly packed asbestos are produced with intervening spaces which, after vulcanization, are filled with rubber substantially without any asbestos. As a consequence, the friction effect is non-uniform and varies as the material wears.

Again, facings have been made of pulp and millboard, which in the past have been satisfactory, but which are less able to meet the difficult conditions of service at present required than are the high grade woven facings.

Accordingly, it is an advantage of the present invention to produce facings having the desired qualities of wearing and smooth engagement which have been attained in the past only with the costly woven linings cut from whole cloth, and to secure these advantages in a much less expensive facing than any heretofore known of comparable quality.

According to my invention, a high-grade facing comparable in service qualities with the best grade woven linings can be made by cutting a singe disc from undistorted woven asbestos cloth which has been impregnated with a low rubber content compound, such for example as has been used in the best grade of laminated woven clutch facings. A second ring may be formed of pulp, for example, by extruding the pulp strip according to the process described and claimed in the Novak United States Patent No. 1,785,701 or the co-pending application of myself and Albert Whitelaw, Serial No. 376,639, filed July 8, 1929, of which the present application is a continuation in part. The pulp, for example, may be extruded in a wide strip several times the thickness of the fabric ring and at least as wide as the diameter of the ring, and from this strip a ring of corresponding diameters, but of greater thickness than the fabric strip, may be cut. The two are then superposed and vulcanized, preferably in a follower mold, under high mechanical pressure.

Instead of a pulp backing, other backings may be used of materials which are sufficiently strong to hold the woven surface and to absorb and transmit the driving torque which is received by said woven surface, and particularly to hold the heads of the rivets which are used to secure the lining to the clutch plate. For example, millboard rings impregnated with a suitable binder may be used to back the woven surface ring, and may be cemented thereto either by the cementing action of the rubber, or other binder used in the millboard, or by some other cement used between the two materials.

With both the millboard and the pulp linings, it is desirable to perform the final hardening treatment in a mold which has projections for forming the countersinks for the rivet heads. In this way, the woven facing will extend beneath the rivet heads, and the strength inherent in the woven fabric will serve to reinforce the pulp or millboard backing beneath the rivet heads. In this way, furthermore, the driving torque will be at least in part transmitted directly through the fabric facing to the rivets, and any tendency to longitudinal splitting of the ring will be thereby lessened.

A superior friction ring can also be made by a combination of an undistorted woven facing and a coned woven fabric backing.

In the accompanying drawing, I have shown in Fig. 1 a cross-section through a facing ring made of undistorted woven asbestos fabric and a backing of pulp or millboard.

In Figs. 2 and 3, I have shown a ring made from a facing of undistorted asbestos fabric and a backing of coned fabric.

Referring first to Fig. 1, I have shown a facing ring 10 of undistorted woven asbestos fabric. This facing ring is preferably made of a medium weight, closely woven, high-grade asbestos cloth, and is cut preferably in one piece from the whole cloth. The backing ring 11 is composed of a felted asbestos fabric, as for example, either pulp or millboard, and if pulp, may be made either by a sheeting process or by an extrusion process, such as has already been described above. The composition of this backing may vary substantially, but preferably contains a relatively small proportion of rubber and a relatively large proportion of refractory filler material which will withstand heat created by the friction when the clutch is slipped in service. Advantageously this backing is composed largely of short fibre asbestos with sufficient binder, preferably rubber or synthetic resin, to hold the backing substantially rigid, and to give additional strength to the material.

In the manufacture of this form of ring, the facing of the ring 10 and the backing ring 11, formed as already described, are superposed and preferably are placed in a follower mold having projections corresponding to the countersinks 13. This mold is preferably of the follower type, so that the backing may be vulcanized to the facing under pressure, and this pressure causes the binder to flow sufficiently to mold the cloth of the facing ring 10 closely about the countersink projections. Thus, not only is a separate countersink operation avoided, but the facing cloth is made to extend beneath the rivet heads, and thereby, as already described, to substantially strengthen their hold upon the facing.

In Figs. 2 and 3, I have shown a backing which is composed of the facing ring 10, similar to the corresponding facing ring of the form shown in Fig. 1, and a backing 12 of folded and coned asbestos cloth. The facing ring in this case, as in the embodiment shown in Fig. 1, is preferably cut from a high grade medium weight asbestos cloth impregnated with a low rubber content composition and, as in the case of Fig. 1, is preferably cut in a single piece from the whole cloth. The backing 12 is composed of a more loosely woven asbestos cloth impregnated with a higher proportion of rubber. A strip of this cloth approximately twice the width of the ring 10 is folded double, and is then passed between a pair of cone rollers in the usual manner, as already described above, and in this way the strip is stretched along one edge and compressed and creased at the other edge until it assumes approximately a circular shape. It is then cut to the desired length and its ends abutted so that it forms a ring of substantially the same size as the ring 10. The two are then placed together, preferably in a follower mold, and are vulcanized under pressure in the same manner as described in Fig. 1.

Although I have above described and illustrated in the drawing two specific embodiments of my invention, and have suggested certain modifications thereof, it will be readily understood by those skilled in the art that many other changes and modifications may be made without departing from the scope of this invention.

What I claim is:

1. A friction facing ring comprising a surface ring cut from an asbestos cloth fabric and having the threads thereof in substantially undistorted relation, and a backing layer of a material which is substantially not distorted from circular form by circumferential stresses, and which comprises a refractory reinforcing material and a hardened binder, said binder serving also to unite said layers into a strong coherent ring.

2. A friction facing as defined in claim 1, in which the backing is composed of a strip of asbestos cloth impregnated with rubber and coned to circular shape.

3. A friction facing as defined in claim 1, in which the backing is composed of a strip of asbestos cloth impregnated with rubber and having its longitudinal threads running circumferentially of the ring.

4. A friction ring as defined in claim 1, in which the backing is comprised of a felted asbestos composition including a binder.

5. A friction facing as defined in claim 1, in which both the facing fabric and the backing layer are impregnated with a rubber composition and the two are vulcanized together into a strong coherent ring.

6. A friction facing as defined in claim 1, in which the cloth of the surface ring is depressed around the rivet holes to form a reinforcing under the rivet heads in the countersinks.

HAMILTON ABERT.